Patented May 11, 1948

2,441,423

UNITED STATES PATENT OFFICE

2,441,423

ALKYLSILICON SOLS AND GELS

John R. Elliott and Robert H. Krieble, Schenectady, N. Y., assignors to General Electric Company, a corporation of New York No Drawing. Application February 10, 1945, Serial No. 577,343

12 Claims. (Cl. 260—29)

The present invention relates to novel alkylsilicon sols and gels. It is particularly concerned with sols of lower alkyl siliconic acids and their condensation products, and with gels prepared therefrom, the products being distinguished from the organosilicon-silica sols and gels described and claimed in our copending application S. N. 577,342, filed concurrently herewith by the fact that all of the silicon atoms in the present sols and gels are connected to at least one lower alkyl radical, such as a methyl or ethyl radical.

The siliconic acid solutions, which have previously been known (Meads and Kipping, J. C. S. 107, 459–468) and which were prepared by acidification of aqueous solutions of alkali siliconates, were unstable products from which siliconic acid condensation products separated as fluocculent, oily, or gluelike precipitates.

The present invention is based on the discovery that the character of the products is greatly modified by the use of aqueous alcoholic media, or an equivalent media comprising water and a substantial amount of a water-miscible organic solvent, in the partial or complete neutralization of the siliconate. Under such conditions, the addition of less than 1.0 equivalent of acid per mol of siliconate results in the formation of a solution which sets to a translucent resilient gel having the same volume as the original solution, while a clear sol, stable for many days, is obtained by the addition of slightly greater amounts of acid. Thus by the addition of less than equimolecular proportions of alcoholic acetic acid to sodium methyl siliconate, a sol has been obtained which within a few hours was converted to a gel having a volume equal to the volume of the original sol, while by the addition of a slight excess of alcoholic acetic acid, sols which were stable for days were obtained. These products were half-molar in the silicon compounds and 80% in alcohol. For the preparation of more concentrated sols, it is preferable to add the sodium siliconate solution to the acid. The stability of the sols is further increased by the removal of electrolytes.

The minimum amount of alcohol or other water-miscible solvent required to obtain gelation rather than precipitation depends on the degree of neutralization of the siliconate and increases with the degree of neutralization. In all cases at least 15% water-miscible solvent is required. Thus in a series of experiments wherein the final products were half-molar concentration in siliconic acid units, gels were formed when the liquid media contained at least 15% by volume of alcohol or equivalent water-miscible solvent and the siliconate was partially neutralized by the addition of about one-half equivalent of acid. As the amount of acid was increased from about 0.7 equivalent to about 0.95 equivalent, the amount of alcohol required to obtain a gel increased from about 20% to about 65% by volume. For a medium of given composition, the gel time decreases slowly with increasing ratio of acid to siliconate, reaching a minimum at an equivalent ratio of between 0.95 and 1.00 and thereafter rising exceedingly sharply as the ratio passes through 1.00, giving rise to relatively stable sols at a pH of 7 or less, preferably 1.5 to 6.5. Isopropyl alcohol, acetone and other water-miscible organic solvents have been successfully employed in place of the ethyl alcohol.

The following example illustrates the differences between the known siliconic acid products and the sols of the present invention:

Example 1

Following prior practices, 16.15 cc. of a 3.095 molar solution of sodium methyl siliconate (0.050 mol) was added to a mixture of 25.00 cc. of 2.050 N aqueous acetic acid (0.051 mol) and 58.85 cc. water. A clear sparkling solution was obtained from which a substantial amount of siliconic acid condensation products precipitated as a flocculent solid in the course of about 5 hours. On the other hand, when 16.15 cc. of the same solution of sodium methyl siliconate was run into a mixture of 26.05 cc. of alcoholic 2.018 N acetic acid (0.052 mol) in 57.8 cc. of 95% alcohol, a clear sol was obtained which was unchanged in appearance after standing 72 hours at room temperature.

The sols described herein may be used to render glass, ceramics, textiles, paper, etc., water repellent simply by drying the sol-wetted article.

Any acid or salt suitable for the preparation of ordinary silica sols and gels may be employed in the practice of the present invention. By using an acid capable of forming with the metallic ion of the siliconate a salt that is insoluble in the organic solvent-water mixture, and filtering out the precipitated salt, a substantially salt-free sol of even greater stability is formed. Thus for instance, the sol obtained from the following example was substantially unchanged after standing 2640 hours at room temperature.

Example 2

Nine and three tenths cc. of 5.38 molar sodium methyl siliconate (0.050 M) was rapidly added to a violently stirred solution of 7.8 cc. of 7.1

$NH_2SO_4$ (0.055 equivalent) in 83 cc. of 95% alcohol. The sodium sulfate formed, being insoluble in alcohol, crystallized out and was removed by filtration. The resultant stable sol had a pH of 1.5.

Another sol prepared in a similar manner except that the excess sulfuric acid was only sufficient to lower the pH to 5.9 was unchanged after 1535 hours. As the pH is raised still higher, the stability falls off rapidly and gelation occurs at pH's above 7.

It is obvious that salt-free sols may also be made by the use of ion-exchange resins and the like.

Example 3

Twenty-five cc. of an aqueous 2.0 molar sodium ethyl siliconate solution (0.050 mol) was run into a mixture of 26.5 cc. of 2.0 molar acetic acid (0.053 mol) and 50 cc. of absolute alcohol. A stable ethyl siliconic acid sol was obtained.

Example 4

A solution of 0.75 mol of sodium methyl siliconate in 135 cc. of water was run rapidly into a violently stirred solution of 0.74 mol of sulfuric acid in 300 cc. of 33% aqueous alcohol until a pH of 6.5 was reached, at which point the addition was stopped. The resulting sol was diluted to 1 liter with 95% alcohol. The precipitated sodium sulfate was removed by filtration. After standing for 48 hours at room temperature, the 0.75 molar sol set to a firm gel entirely pervading the liquid. Small samples of the gel were dried in a 100° oven. A clear, colorless, greatly shrunken xerogel, visually very similar to silica xerogel, was produced. The remaining gel was then extracted with ether and autoclaved at 1000 p. s. i. and 250° C. to remove the liquid above the critical pressure and above the critical temperature following the process described in our above identified copending application. A white liquid-free, highly water-repellent aerogel of substantially unchanged volume was obtained. Unlike known aerogels it did not shrink when it was immersed in water and thereafter heated at normal pressures.

Sols and gels may also be prepared from the cocondensation products of lower alkyl silicones and lower alkyl siliconic acids, with or without silicic acid. Such products comprising silicic acid are described and specifically claimed in our above identified copending application. The following examples illustrate the preparation of cosols and cogels of methyl siliconic acid and minor proportions of a methyl silicone from their alkali salts:

Example 5

Twenty-five and nine-tenths pounds of a mixture of 87% by weight of methyltrichlorosilane and 13% by weight of dimethyldichlorosilane were added in the course of a few minutes beneath the surface of a violently stirred slurry of 30 pounds ice and 30 pounds water, an additional 150 pounds of ice being added at the same time thereby maintaining a temperature below 0° C. A turbid unstable sol formed which rapidly began to precipitate a very finely divided, sticky precipitate. After stirring gently for 5 hours the powder was no longer sticky and was very readily filtered and washed. The wet filter cake was partially dissolved by stirring with a solution of 8.3 pounds of sodium hydroxide in 25 pounds of 55% alcohol. Most of the alcohol was distilled out and replaced with water. In the course of the distillation the cake was substantially completely dissolved. The solution was filtered to remove a very small amount of suspended sludge. The filtrate consisted of a mixture of sodium siliconate and siliconeate. It was found by analysis to contain 21.3 weight per cent $(CH_3)_{1.15}SiO_{1.43}$ and 12.3 weight per cent $Na_2O$. Thus about 15 per cent of the silicon atoms were connected to two methyl groups. 18.82 cc. of the filtrate was run into a mixture of 13.3 cc. of 7.08 N $H_2SO_4$, 10 cc. water, and 10 cc. alcohol. A clear sol was formed having a pH of 6.2. An additional 50 cc. of alcohol was added and the precipitated sodium sulfate was removed by filtration. The resulting stable sol was unchanged after several days.

Example 6

This example illustrates the prepaartion of cosols and cogels in which about 10% of the silicon atoms are connected to two methyl groups. 24 cc. of 2.018 N alcoholic acetic acid was added to a solution of 1.35 cc. of 3.70 molar alcoholic potassium dimethyl siliconeate, 14.53 cc. of 3.095 molar aqueous sodium methyl siliconate and 60 cc. of alcohol. The potassium dimethyl siliconeate was prepared by dissolving dimethyl silicone in alcoholic KOH as described in our above mentioned copending application. A clear sol was formed which in about 2 hours was transformed to a gel, the structure of which occupied the entire volume of the original sol.

What we claim as new and desire to secure by Letters Patent of the United States is:

1. The method of preparing a colloidal dispersion which comprises adding (1) an aqueous solution of a water-soluble alkali-metal salt of a lower alkyl siliconic acid to (2) a solution of an acid to obtain a dispersion having a pH of from 1.5 to 6.5, the solvent for the said acid consisting of (a) water and (b) an organic solvent selected from the class consisting of water-miscible alcohols and water-miscible ketones, the organic solvent being present, by volume, in an amount equal to from 15 to 80 per cent of the total volume of all the water and organic solvent present.

2. A sol prepared in accordance with the method described in claim 1.

3. The method as in claim 1 wherein the alkyl siliconic acid is methyl siliconic acid.

4. The method as in claim 1 wherein the alkyl siliconic acid is ethyl siliconic acid.

5. The method of preparing a relatively stable organo-aquasol which comprises adding an aqueous solution of a water-soluble sodium salt of methyl siliconic acid to a solution of an acid to obtain a dispersion having a pH of from 1.5 to 6.5, the solvent for the said acid consisting of (a) water and (b) ethyl alcohol, the said alcohol being present, by volume, in an amount equal to from 15 to 80 per cent of the total volume of all the water and alcohol present.

6. An organo-aquasol prepared in accordance with the method described in claim 5.

7. The method of preparing an alcohol-aquagel which comprises adding an aqueous solution of a water-soluble sodium salt of methyl siliconic acid to an aqueous alcoholic solution of sulphuric acid, the said alcohol being present, by volume, in an amount equal to from 15 to 80 per cent of the total volume of all the water and alcohol present, discontinuing the addition of (1) to (2) when the pH of the resultant sol is from 1.5 to 6.5, diluting the said sol by adding alcohol thereto to precipitate sodium sulphate, removing said sodium sulphate from said sol and allowing the said sol to gel.

8. An alcohol-aquagel prepared in accordance with the method described in claim 7.

9. The method of preparing an aerogel which comprises rapidly adding (1) an aqueous solution of a water-soluble sodium salt of methyl siliconic acid to (2) a violently stirred solution of sulphuric acid in aqueous ethyl alcohol, the said alcohol being present, by volume, in an amount equal to from 15 to 80 per cent of the total volume of all the water and alcohol present, and the molar amount of the sulphuric acid in the solution of (2) being slightly less than the molar amount of the aforementioned sodium salt in the solution of (1), discontinuing the addition of (1) to (2) when the pH of the resulting sol reaches 6.5, diluting said sol by adding ethyl alcohol thereto thereby to precipitate sodium sulphate, removing sodium sulphate from said sol and allowing the purified sol to gel, and removing the liquid from said gel at an elevated temperature and above the critical temperature of the vaporized liquid thereby to form an aerogel.

10. An aerogel prepared in accordance with the method described in claim 9.

11. The method of preparing an aerogel which comprises (1) adding an aqueous solution of a water-soluble alkali-metal salt of a lower alkyl siliconic acid to a solution of an acid to obtain a pH of from 1.5 to 6.5 and thereby to form a sol, the solvent for the said acid consisting of (a) water and (b) an organic solvent selected from the class consisting of water-miscible alcohols and water-miscible ketones, the organic solvent being present by volume in an amount equal to from 15 to 80 percent of the total volume of all the water and organic solvent present, (2) diluting the resulting sol by adding an alcohol thereto to precipitate the alkali-metal salt of the acid used in preparing the sol, (3) removing the precipitated salt from the said sol, (4) allowing the purified sol to gel, and (5) removing the liquid from the said gel at an elevated temperature and above the critical temperature of the vaporized liquid thereby to form an aerogel.

12. An aerogel prepared in accordance with the method described in claim 11.

JOHN R. ELLIOTT.
ROBERT H. KRIEBLE.

REFERENCES CITED

The following references are of record in the file of this patent:

UNITED STATES PATENTS

| Number | Name | Date |
| --- | --- | --- |
| 2,093,454 | Kistler | Sept. 21, 1937 |
| 2,258,218 | Rochow | Oct. 7, 1941 |
| 2,285,449 | Marshall | June 9, 1942 |
| 2,377,689 | Hyde | June 5, 1945 |
| 2,408,656 | Kirk | Oct. 1, 1946 |

FOREIGN PATENTS

| Number | Country | Date |
| --- | --- | --- |
| 55,899 | Russia | Oct. 31, 1939 |

OTHER REFERENCES

Stock, "Berichte Deut. Chem. Gesel," vol. 52, 1919, pp. 695 and 708.

Meads et al., J. Chem. Soc. (London), vol. 105, pp. 679–90 (1914).

Meads et al., J. Chem. Soc. (London), vol. 107, pp. 459–68 (1915).

Andrianov, J. Gen. Chem. U. S. S. R., vol. 8, pp. 1255–1263 (1938).